United States Patent [19]

Dehn et al.

[11] Patent Number: 5,005,015
[45] Date of Patent: Apr. 2, 1991

[54] ICE DETECTION SYSTEM

[75] Inventors: Rudolph A. Dehn, Schenectady; Andrew J. Macdonald, Ballston Spa, both of N.Y.

[73] Assignee: General Electric Company, Schenectady, N.Y.

[21] Appl. No.: 390,125

[22] Filed: Aug. 7, 1989

[51] Int. Cl.$^5$ .................... G08B 21/00; B64D 15/00
[52] U.S. Cl. .............................. 340/962; 244/134 F; 340/580
[58] Field of Search ............... 340/962, 905, 580, 581, 340/582, 583; 73/170 R, 590, 583; 244/134 R, 134 D, 134 F

[56] References Cited

U.S. PATENT DOCUMENTS

| 3,123,327 | 3/1964 | Padgett, Jr. | 340/580 |
| 3,540,025 | 11/1970 | Levin et al. | 340/962 |
| 4,461,178 | 7/1984 | Chamuel | 340/582 |
| 4,570,881 | 2/1986 | Lustenberger | 244/134 F |
| 4,688,185 | 8/1987 | Magenheim et al. | 340/580 |
| 4,766,369 | 8/1988 | Weinstein | 340/580 |

OTHER PUBLICATIONS

T. R. Ringer Head & J. R. Stallabrass, "The Dynamic Ice Detector For Helicopters", Agard Conference Proceedings, No. 236, Apr., 1978.
J. A. Gagliano et al., "Ice/Frost Detection System Using Millimeter Wave Radiometry", Final Report-NASA Contract NAS8-33800, Aug. 1981.
B. Magenheim et al., "Development and Test of a Microwave Ice Accretion Measurement Instrument (Miami)", NASA Contract Report 3598, Nov. 1982.
L. M. Weinstein, "Ice Detector" (Capacitive), Govt. Owned Patent #6,846,429, 1986 (NASA publication 86346479).

Primary Examiner—Herbert Goldstein
Assistant Examiner—Brent A. Swarthout
Attorney, Agent, or Firm—Marvin Snyder; James C. Davis, Jr.

[57] ABSTRACT

A system and method for detecting the state and thickness of water accumulation on a surface incorporates a plurality of spaced, thin, electrically resonant circuits bonded to the surface and a radio frequency transmitter for exciting the circuits to resonance. A receiver detects the resonant signal from each circuit, determines the resonant frequency and quality factor of the circuit and correlates that information with predetermined data representing changes in resonant frequency and quality factor as a function of liquid water and ice accretion to thereby establish the state and thickness of water overlaying the circuits.

13 Claims, 4 Drawing Sheets

ICE DETECTION SYSTEM

BACKGROUND OF THE INVENTION

This invention relates to ice detectors and, more particularly, to an ice detector for determining location and thickness of ice build-up on an aircraft propeller.

Various forms of ice detectors for use with aircraft have been developed. Such detectors include radiometric devices broadcasting in the 35-95 GHz frequency band and relying on frequency shifts in reflected waves such as is disclosed in NASA Contract NAS8-33800 on "Ice/Frost Detection System Using Millimeter Wave Radiometry". Another form of millimeter wave detection is described in NASA Contract Report 3598 entitled "Development and Test of a Microwave Ice Accretion Measurement Instrument (MIAMI)". This latter device uses a resonant surface-mounted transducer whose resonant frequency varies in proportion to thickness of an overlying ice layer. A microcomputer monitors the resonant frequency of the transducer to provide a continuous indication of ice thickness. The transducer is described as a resonant wave guide. Still another ice detector, described in NASA publication 86346479, also identified as NASA-CASE-LAR-13403-1, "Ice Detector", uses a pair of capacitance gauges in combination with a temperature gauge mounted in a cavity on an aircraft structure. The temperature gauge provides an indication of the state of any overlying water, i.e., solid or liquid, while the capacitance gauges provide an indication of thickness.

The above-identified ice detectors have not been fully satisfactory, as is evident by the extent of ongoing research into alternative devices. For example, radiometry requires an essentially stationary surface, and a large power source and antenna for illuminating the surface to be viewed. The resonant wave guide is an intrusive device and requires a directly coupled power source which may be acceptable in surfaces that are not essential to structural integrity but could detrimentally affect structural integrity in applications where such surfaces are essential to structural integrity. Similarly, use of capacitance and temperature gauges requires intrusion into a surface and some form of direct connection for readout The application of any of these systems to high-speed rotating aircraft propellers could therefore present unsolvable problems.

SUMMARY OF THE INVENTION

One object of the present invention is to provide an ice detection system which overcomes the above and other disadvantages of the prior art.

Another object is to provide a nonintrusive system for determining thickness of water, in a liquid or solid state, at predetermined locations atop a surface.

Another object is to provide an ice detection system having a nonintrusive transducer which can be remotely interrogated to determine ice conditions.

Another object is to provide an ice detection system that can be employed on a high speed rotating aircraft propeller.

Briefly, in accordance with a preferred embodiment of the invention, an ice detection system for detecting the state (i.e., solid or liquid) and thickness of water overlying a surface comprises a plurality of surface-mounted resonant circuits spaced at predetermined locations about the surface, each circuit having a respective preselected resonant frequency which varies in response to thickness of overlying water, whether in its solid state (i.e., ice), or in its liquid state. A variable frequency generating means generates a signal which can be varied about the resonant frequency of each of the circuits. A receiver means is tunable to the resonant frequency of each of the circuits and includes means for identifying the resonant frequency of each of the circuits and for determining the quality factor (Q) of each circuit. Processing means responsive to the identified resonant frequency and determined quality factor establish the state of thickness of water overlying each of the resonant circuits.

Each of the resonant circuits, respectively, is preferably tuned to a different preselected resonant frequency, respectively, to permit remote identification of the location of the resonant circuit from the resonant frequency. The resonant circuits preferably comprise thin foil members, each member having its own unique resonant aperture formed therein which can be excited by received radio frequency (RF) signals. The thin film resonant circuits may be bonded to an intermediate subsurface layer of a propeller blade and overlaid with a nonconductive surface protective coating such as a polyurethane coating.

The variable frequency generating means may comprise a high frequency radio transmitter which can be variably swept through a predetermined frequency range encompassing the resonant frequencies of all of the tuned circuits. The receiver means may be keyed by the transmitter for correlating the received signals with the transmitted signals in order to ascertain the location of each of the resonant circuits. The processing means determines the thickness of ice or liquid overlying each of the resonant circuits from the resonant frequency of the respective circuit and that circuit's corresponding quality factor. The processing means preferably includes a microcomputer having a memory in which is stored a table of predetermined resonant frequencies and quality factors corresponding to different thicknesses of ice and liquid overlying each of the resonant circuits. By correlating the detected resonant frequency of each of the respective circuits and computed quality factor of those circuits, the processing means can determine from the look-up table the thickness and state of water overlying each of the resonant circuits.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
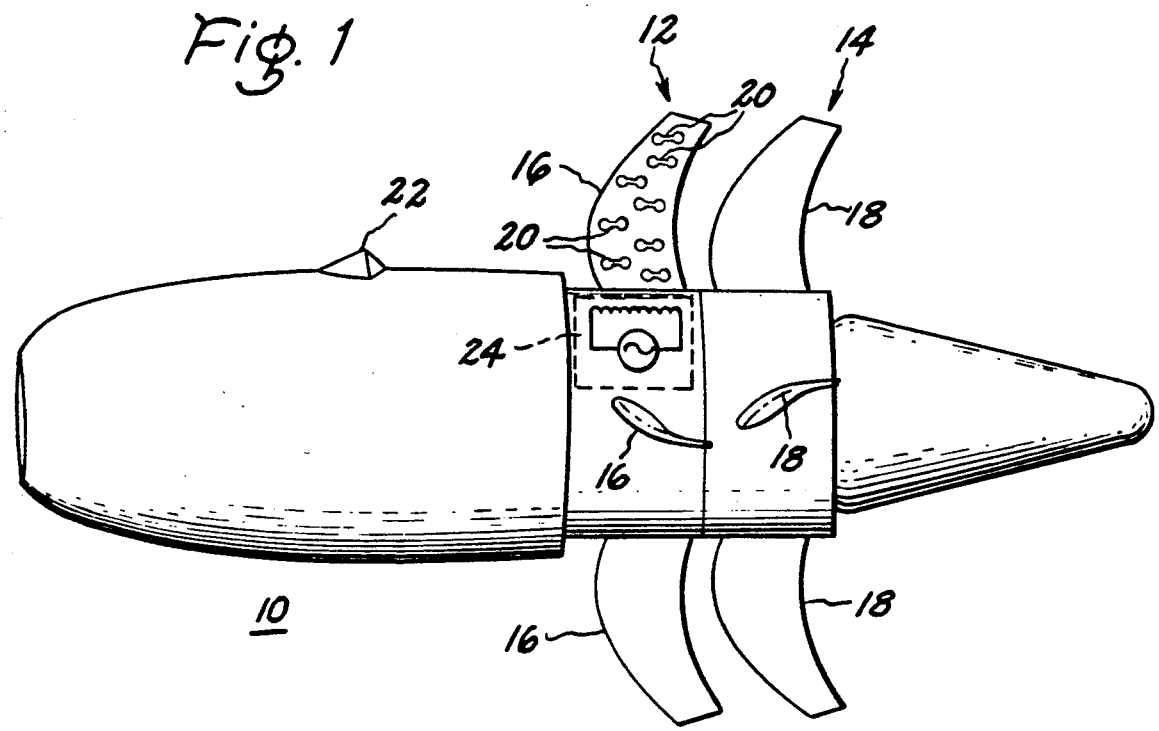
FIG. 1 is a schematic representation of a gas turbine unducted fan engine showing a pair of propellers illustrating one use of the present invention.

FIG. 1 is a schematic representation of a gas turbine unducted fan engine 10 showing a pair of counterrotating propellers 12 and 14 which are driven by the engine. Each of propellers 12 and 14 includes a plurality of propeller blades 16 and 18, respectively. Mounted on each of the propeller blades is a plurality of thin film resonant circuits 20. The circuits, which for simplicity of illustration are shown schematically on only one of blades 16, may be excited by RF energy transmitted from a transmission source 22 or, in an alternative embodiment, may be energized by an RF source 24 inductively coupled thereto.

Figure 2:
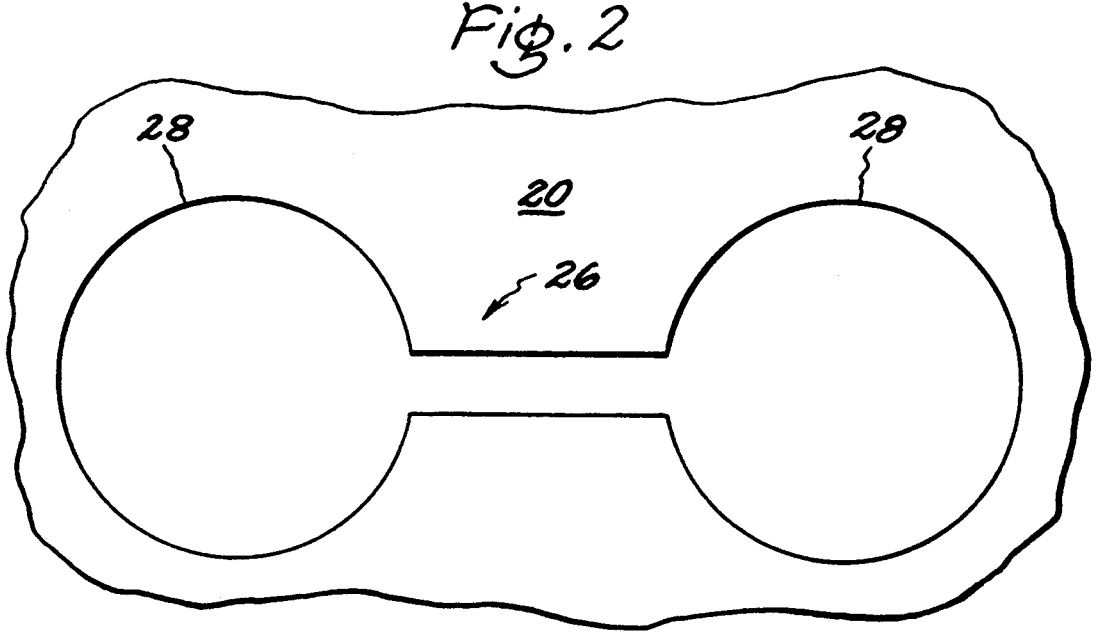
FIG. 2 a planar illustration of one form of thin film resonant for use with the present invention.

A detailed view of one of the blade-mounted resonant circuits 20 is shown in FIG. 2. Each resonant circuit is preferably a dog bone or dumbbell-shaped thin foil or film of electrically conductive material. The center portion 26 of the resonant circuit comprises a pair of parallel conductive foil elements which exhibit a capacitance C, while each of the circular ends 28 of the resonant structure exhibits an inductance L. The interconnected ends 28 and the interconnecting center portion 26 thus form an LC circuit having a characteristic resonant frequency. The physical dimensions of the circuit can be varied in order to tune the circuit so as to change its resonant frequency. In a preferred embodiment, resonant circuits 20, spaced apart from each other at different predetermined locations on each of propeller blades 16 and 18 shown in FIG. 1, are sized so that each respective one of the circuits has a respective resonant frequency unique to that circuit. This allows the resonant circuits to be bonded, or otherwise adhered, to the blades at preselected positions thereon, so that signals from any particular one of the resonant circuits can be associated with the preselected location by identifying the received resonant frequency.

TABLE I

| RESONANT FREQUENCY | Q | CONDITION |
|---|---|---|
| 75 MHz. | 324 | no ice or water |
| 73.9 MHz. | 282 | ~.032" water liquid |
| 74.9 MHz. | 340 | ~.032" ice solid |
| 73.3 MHz. | 255 | ~.25" water liquid |
| 74.8 MHz. | 340 | ~.25" ice solid |

Table 1 illustrates the variation in resonant frequency and quality factor (Q) for one type of tuned resonant circuit in response to different thicknesses (or depths) of overlying ice or water. The circuit was initially tuned to a resonant frequency of 75 MHz with a quality factor of 324. When the circuit was covered with a ⅛ inch layer of liquid water, the resonant frequency changed to 73.9 MHz and the quality factor, or Q, of the circuit dropped to 282. When the water thickness was raised to ¼ inch, the resonant frequency dropped further to 73.3 MHz and the quality factor dropped even further to 255. When the circuit was covered with a ⅛ inch layer of ice (rather than liquid water), the resonant frequency dropped to 74.9 MHz and the quality factor increased to 340. For a ¼ inch layer of ice, the resonant frequency dropped to 74.8 MHz while the quality factor stayed constant at 340. Thus the resonant frequency in combination with the Q for the resonant circuit at that frequency provides an indication of the state of the water overlying the tuned circuit, i.e., whether the water is ice or liquid, and further provides an indication of the thickness of the layer. Even at ⅛ inch difference in thickness provides a frequency change which can be detected.

Figure 3:
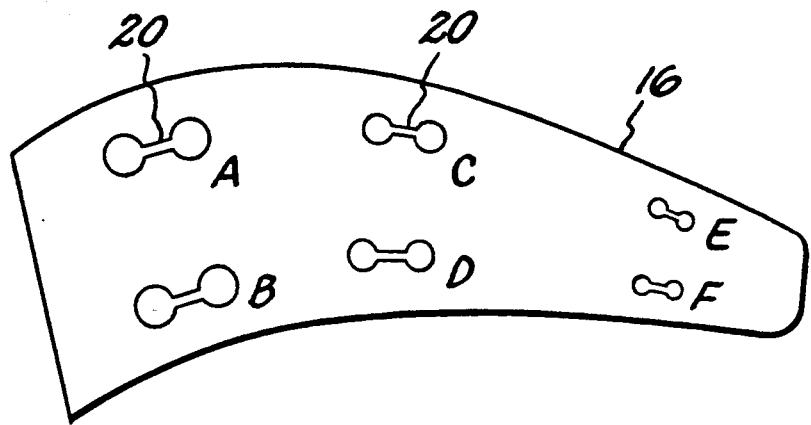
FIG. 3 illustrates a propeller blade having a plurality of spaced resonant circuits of different resonant frequencies, respectively, for detecting ice conditions at various locations of the blade.

FIG. 3 shows a single propeller blade 16 with a plurality of thin film resonant circuits 20 dispersed at positions A-F along the surface of the blade. Each of circuits 20 is differently sized so as to have a unique resonant frequency, i.e., a resonant frequency that is different from that of the others of circuits 20. Transmitter 22, shown in FIG. 1, generates a fixed amplitude variable frequency signal which interrogates or excites each of the tuned resonant circuits 20 on blade 16.

Figure 4:
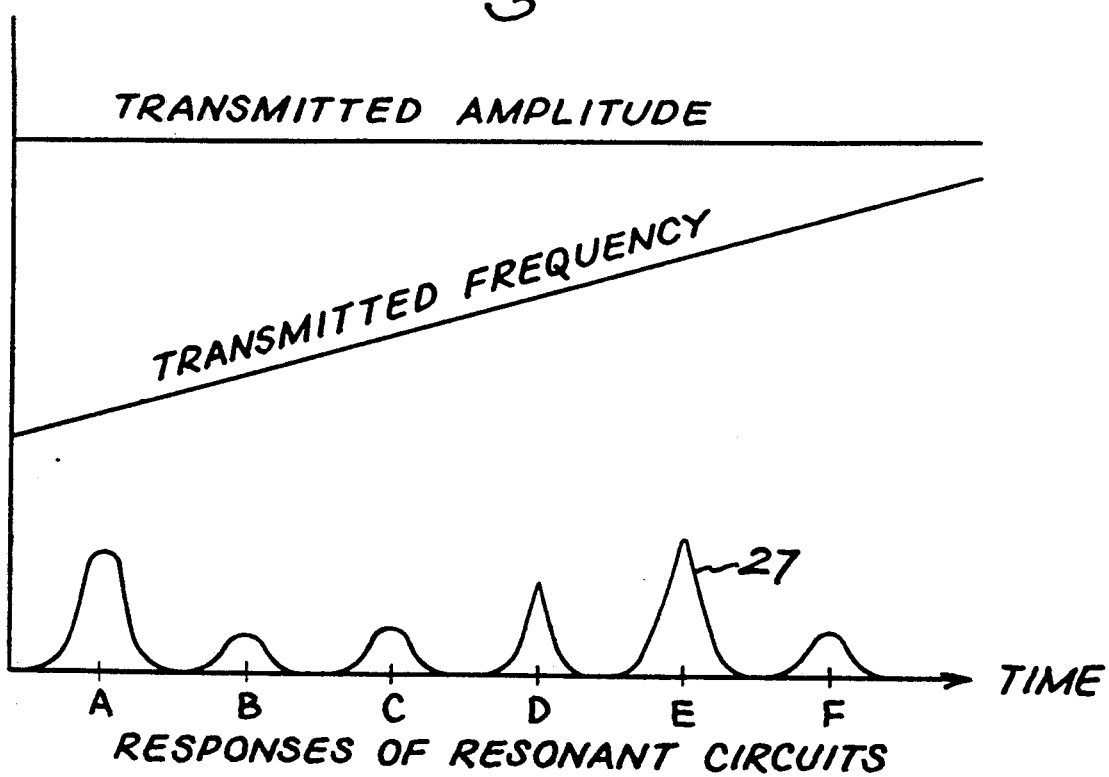
FIG. 4 is a graph of frequency and amplitude of an excitation signal for exciting the resonant circuits of FIG. 3, compared with signals produced by the resonant circuits.

FIG. 4 is a graph indicating the constant amplitude and linearly-increasing frequency of the RF signal from transmitter 22, shown in FIG. 1, while line 27 is a graph of a correlated resonant signal produced by each of tuned circuits 20 in response to the excitation frequency of the RF signal transmitted by transmitter 22 (shown in FIG. 1). The resonant signals produced by each of resonant circuits 20 at positions A-F of FIG. 3 can be distinguished by their time of occurrence with respect to initiation of an RF pulse from transmitter 22. Since the transmitter frequency increases substantially linearly from its initiation until termination, the resonant frequencies are time-distributed, as shown in FIG. 4. Time, and therefore frequency, correlation of the transmitted signal with signals returned from the resonant circuits allows the resonant frequency of each of resonant circuits 20 to be readily determined. Each of the correlated received signals can also be analyzed in a well-known manner to provide a measurement of the Q or quality factor of each one of resonant circuits 20. As illustrated by Table 1, the quality factor provides an accurate indication of the state and depth of any water overlying each one of resonant circuits 20.

Figure 5:
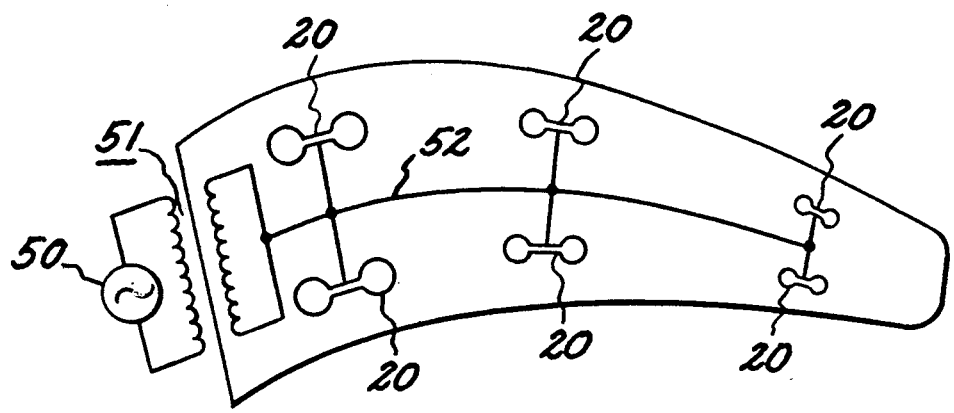
FIG. 5 illustrates an alternative method of exciting the resonant circuits of FIG. 3 through use of inductive coupling.

In an alternative embodiment of the present invention, as illustrated in FIG. 5, an RF excitation source 50 is inductively coupled through inductive coupling devices, shown as the windings of a transformer 51, directly to each of tuned circuits 20. While this arrangement eliminates the need for transmission of a radiated RF signal, it requires coupling of a rotating source of excitation to the rotating portion of the nacelle of engine 10 (shown in FIG. 1) adjacent the propeller blades. This, in turn, requires coupling of RF power to the rotating blade. The RF power source can be located conveniently within the nacelle and include a suitable transmission line to conduct power to an inductive coupling device (e.g., a transformer primary winding) adjacent the hub of the rotating blade. A corresponding coupling device (e.g., a transformer secondary winding) mounted at the blade hub can receive the inductively coupled power for distribution along an appropriate conductive path 52 directly to the various resonant circuits 20 on the blade. In either the radiated transmission or the inductively coupled method, the operation of resonant circuits 20 is substantially the same as described with reference to FIG. 3.

Figure 6:
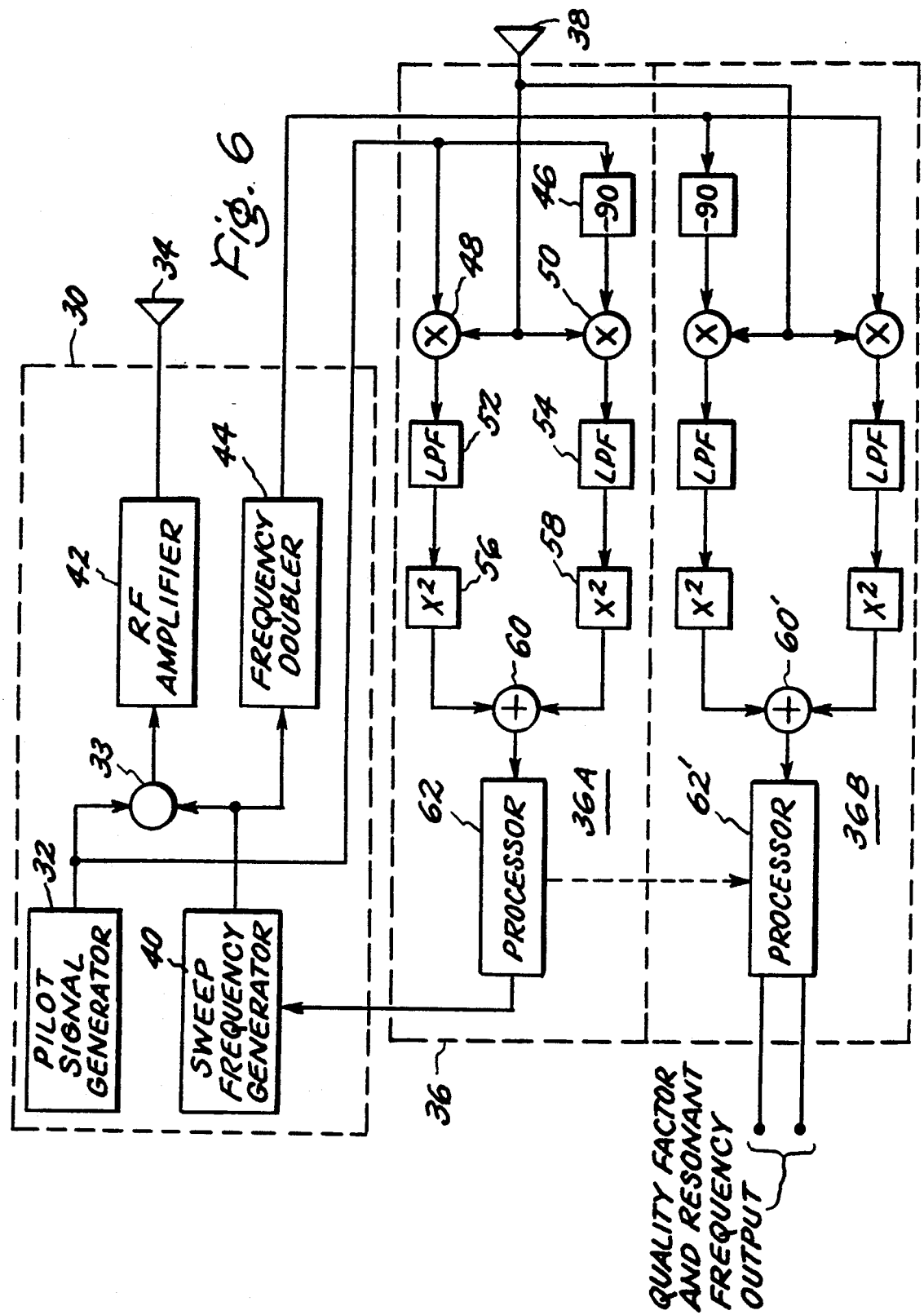
FIG. 6 is a simplified block diagram of one form of radio frequency generator and receiver for practicing the present invention.
Figure 1:
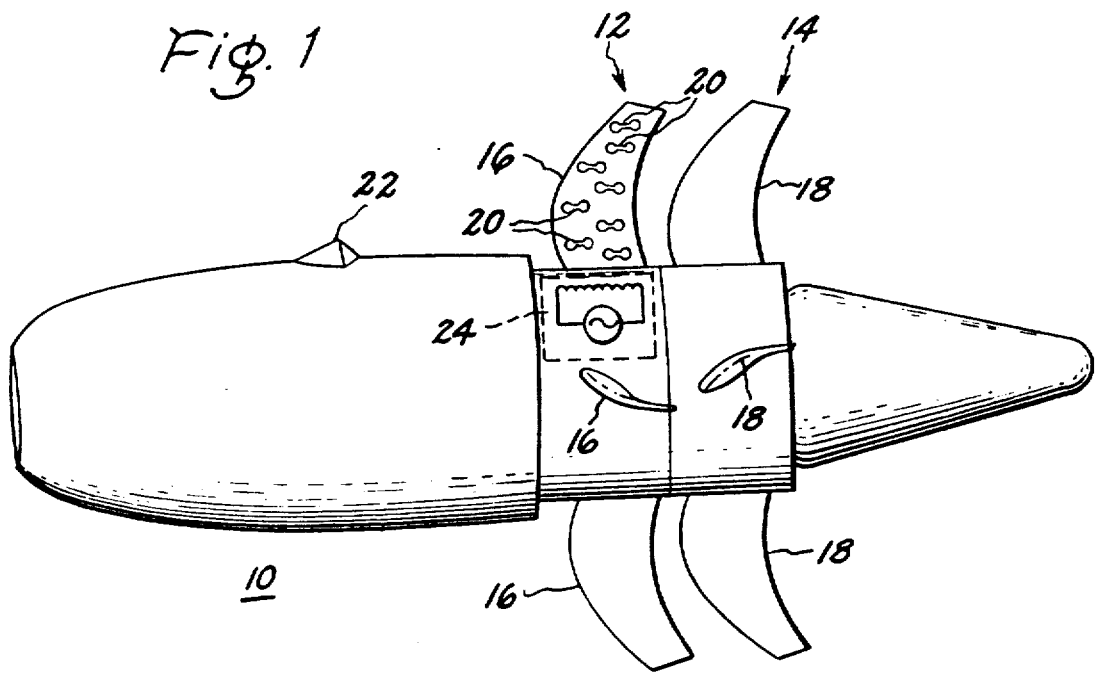
Figure 2:
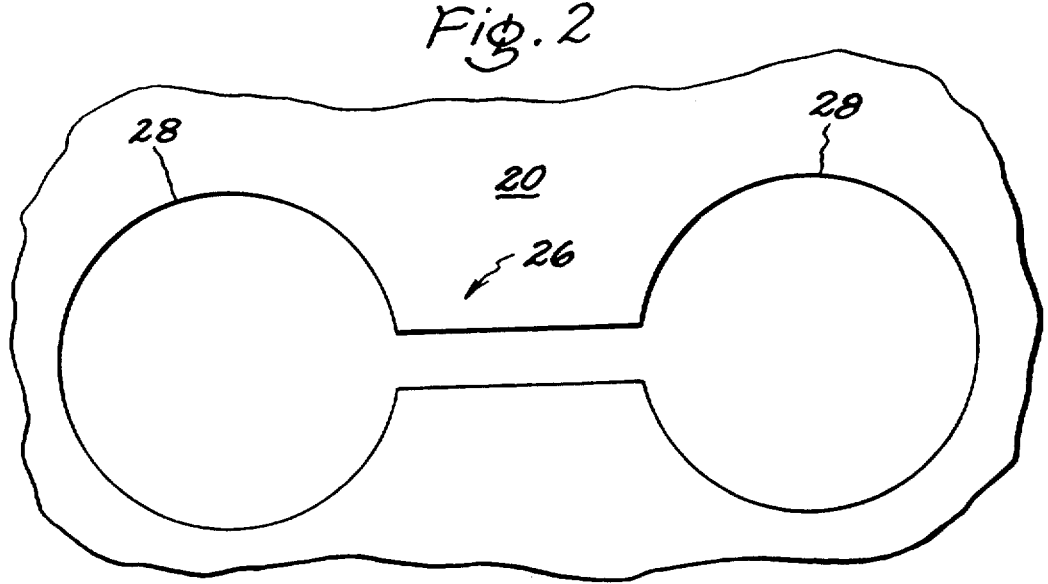
Figure 3:
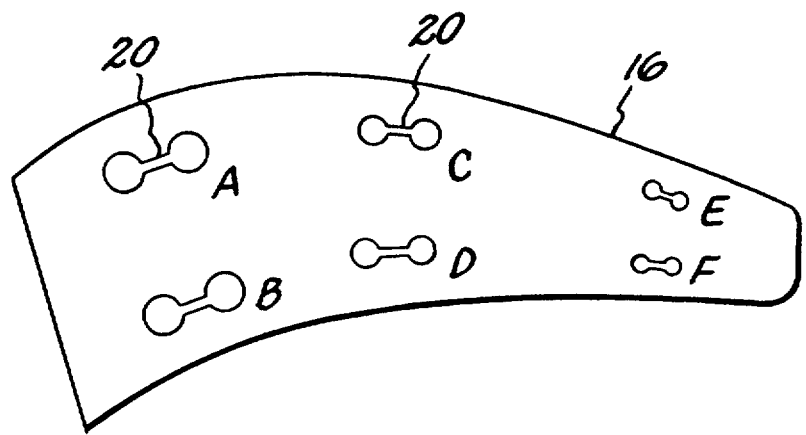
Figure 4:
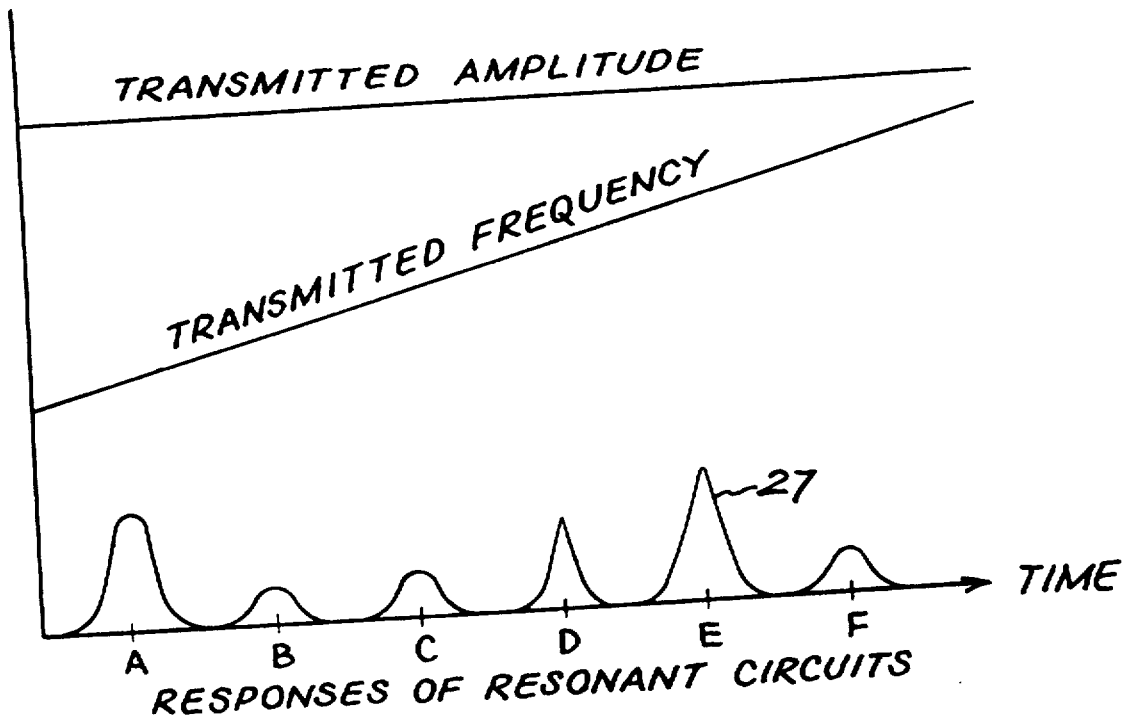
Figure 5:
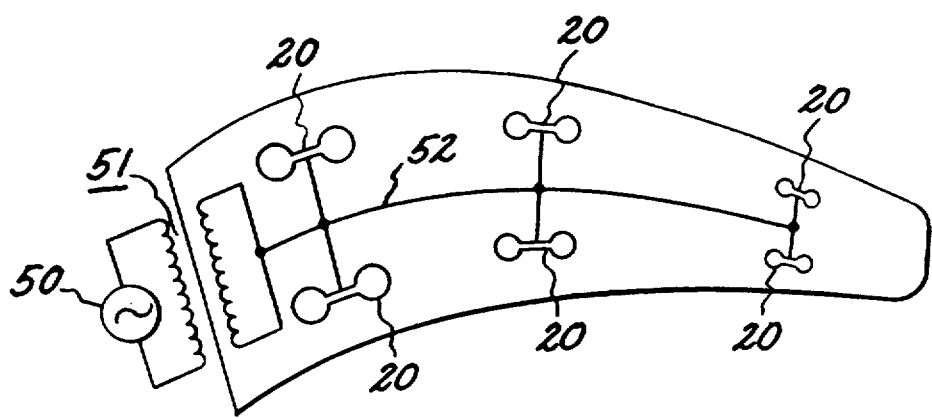
Figure 7:
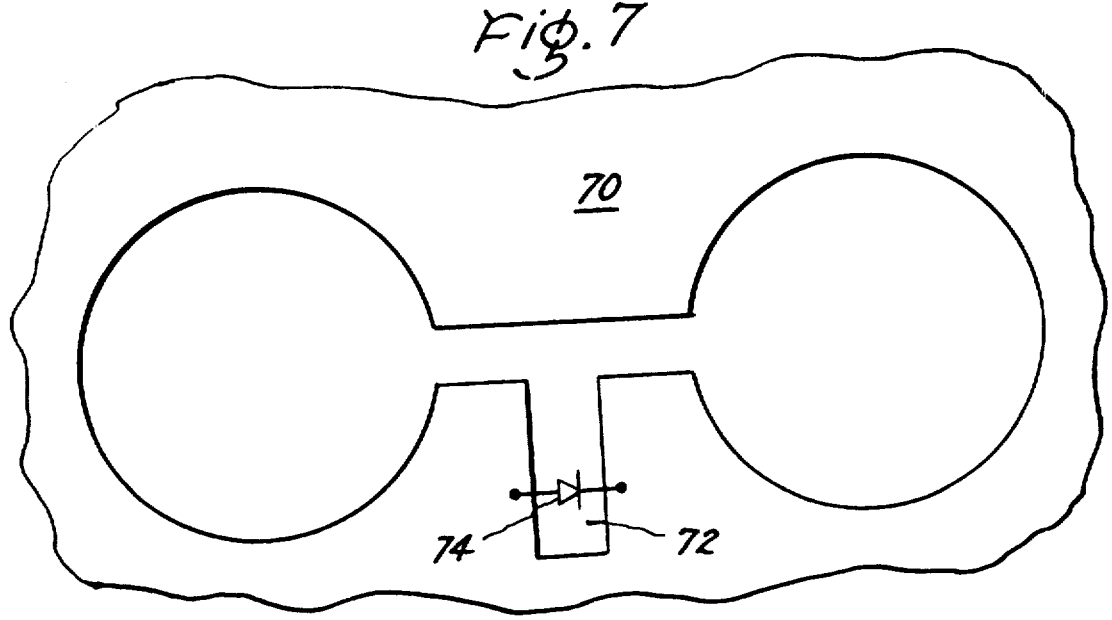
Figure 6:
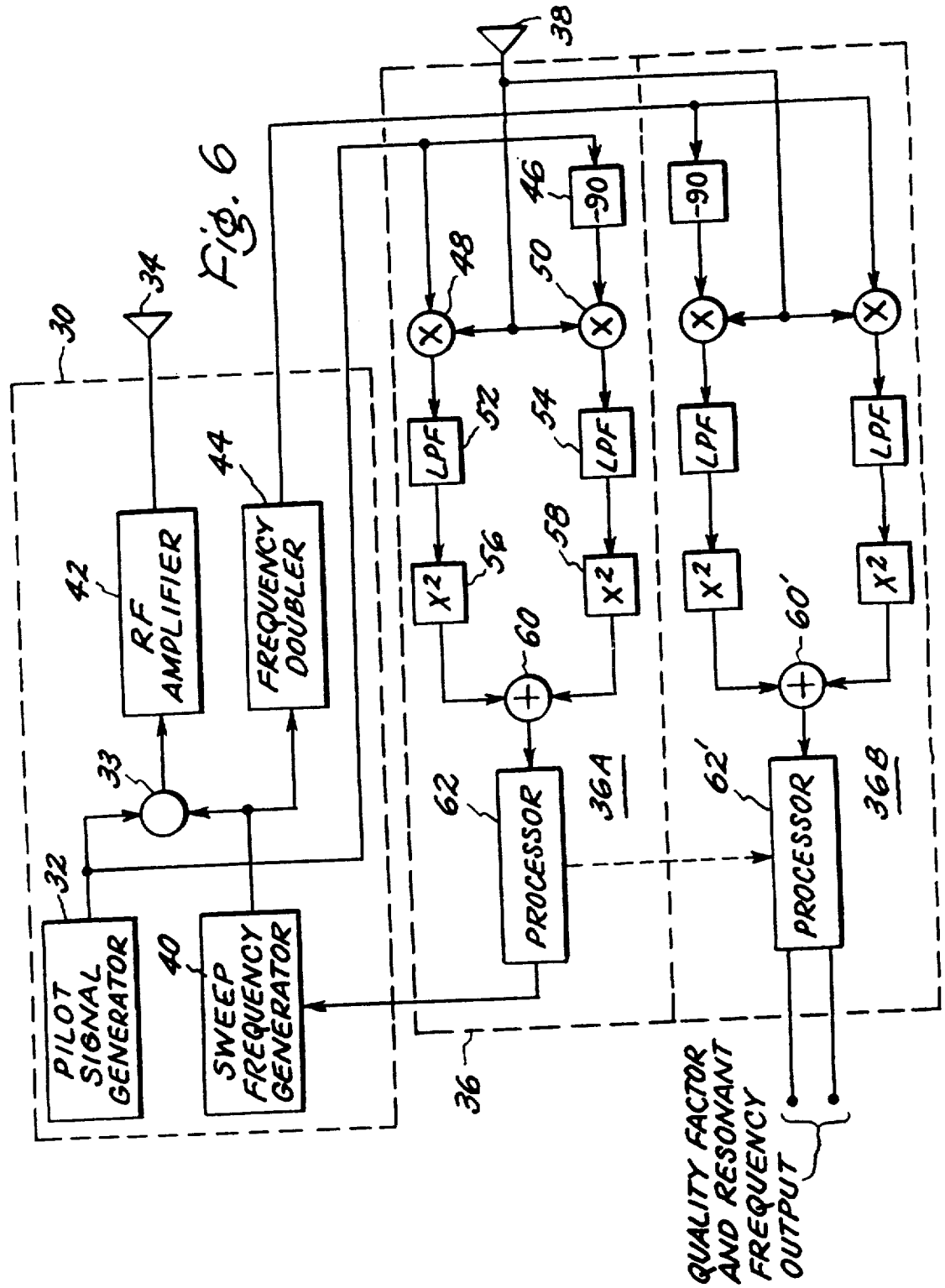

FIG. 6 shows a combined RF generator and receiver of a type which may be used with the present invention. The RF generator, or transmitter, provides excitation to the resonant circuits on each of the propeller blades. Transmitter 30 includes a pilot signal generator 32 which generates a fixed frequency pilot signal. This signal is utilized to detect the presence of a propeller blade in a position such that the resonant circuits affixed thereto can be excited by RF energy transmitted from an antenna 34. Alternatively, the antenna can be replaced by a transformer as shown in FIG. 5. The receiver 36 includes a receive antenna 38 for receiving either reflected energy from the propeller blades or return energy generated by the resonant circuits on the blades. As in the case of the transmitted signal, the received signal may also be coupled inductively. When receiver 36 detects a reflected signal corresponding to the frequency of the pilot signal, the receiver provides a trigger signal to a variable or sweep frequency signal generator 40 in transmitter 30. Sweep frequency generator 40 then produces a swept frequency signal which is summed with the pilot signal in a summer 33. The output signal from summer 33 is amplified by an RF amplifier 42 and transmitted from antenna 34. The swept frequency signal from signal generator 40 is also supplied through a frequency doubler 44 to receiver 36.

Figure 7:
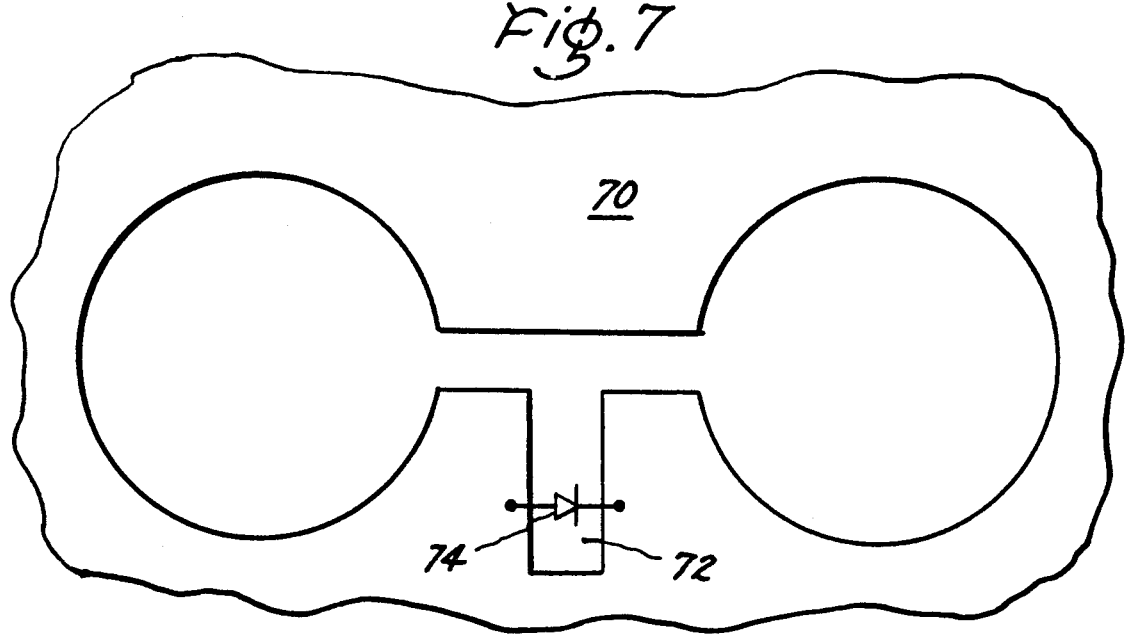
FIG. 7 is an alternative form of resonant circuit for generating a resonant signal at twice the frequency of the excitation signal.

A desirable feature of the ice detection system is that it is possible to distinguish between signals reflected from a propeller blade and signals generated by the various resonant circuits. One method of accomplishing this feature is to construct the resonant circuits so that they resonate at some multiple of the excitation frequency from sweep frequency generator 40. A multiple of two can be achieved by modifying the resonant circuits to the form shown in FIG. 7. The basic requirement is that a voltage at the fundamental frequency be impressed on a nonlinear circuit element such as a semiconductor diode. The resulting current then applied to each resonant circuit is in the form of a highly distorted sinusoid which may be resolved into a series of currents at harmonics of the fundamental frequency. If the circuit arrangement is such as to provide significant impedance to a selected harmonic of current, a voltage at that harmonic is produced with sufficient amplitude to allow extraction of energy at that harmonic by radiation or transmission line coupling. A circuit 70 for producing the aforesaid harmonic voltage, as shown in FIG. 7, is preferably of the dumbbell or dog bone shaped resonant circuit 20 depicted in FIG. 2. Circuit 70 is preferably fabricated as a cutout in a conducting metallic sheet, e.g., etched in the foil of a circuit board or impressed into the metallic surface of a propeller blade. An extended slot 72 is impressed or etched such that the combined cutout is resonant at both the fundamental and second harmonic of the driving signal applied to the circuit. Such dual mode resonators are well known in the art. In order to generate the second harmonic energy, a semiconductor diode 74, preferably in the form of a beam-leaded chip, is connected across slot 22 at a location to effect optimal energy conversion.

Thus, the implementation of the second harmonic detection system contemplates an array of dual resonant circuits dispersed over the surface of the blade with a distribution of resonant frequencies to identify spatial locations of ice formation and with added discrimination against unwanted reflections of the fundamental frequency signals.

In the illustrative embodiment of FIG. 6, transmitter 30 transmits RF energy to resonant circuits such as shown in FIG. 7 on the propeller blades while at the same time providing a signal at twice the sweep frequency from frequency doubler 44 to receiver 36. The transmitted signal is the sum of the pilot signal from signal generator 32 and the sweep frequency signal from signal generator 40. The pilot signal is supplied to receiver 36 to enable detection of the signal reflected from the propeller blades as they become aligned with the transmitter antenna 34. The frequency-doubled sweep frequency signal is supplied to receiver 36 to enable detection of the doubled-frequency signals generated by the resonant circuits on the propeller blades.

While various types of receivers may be employed to detect and identify signals of known frequency (within a predetermined range) and unknown phase, FIG. 6 illustrates one form of such a receiver. Both the pilot signal portion 36A of receiver 36, and the sweep frequency portion 36B thereof, are substantially identical. For purposes of discussion, it can be assumed that the basic reference signal supplied to each resonant circuit is defined by the expression $\cos(\omega_c t)$, where $\omega_c$ represents the signal frequency and $t$ represents time. The received signal (reflected from a blade or generated by a resonant circuit) can be defined by the expression $A\cos(\omega_c t + \theta)$, where $\theta$ is an unknown phase shift. A further reference signal $\sin(\omega_c t)$ is produced by phase shifting the basic reference signal by $-90°$ in a phase shifter 46.

The received signal $A\cos(\omega_c t + \theta)$ is multiplied by $\cos(\omega_c t)$ in a multiplier 48 and by $\sin(\omega_c t)$ in a multiplier 50 to produce respective signals with frequency sum and frequency difference components. Each of the resultant signals is then coupled to corresponding low pass filters 52, 54 which serve to strip the frequency sum components leaving only $\frac{1}{2}(A\cos\frac{1}{2})$ and $\frac{1}{2}(A\sin\frac{1}{2})$. Each of these signals is then squared in respective multipliers 56, 58 to generate the signals $(\frac{1}{2}A)^2\cos^2\theta$ and $(\frac{1}{2}A)^2\sin^2\theta$. Addition of these latter signals in a summer 60 produces the signal $(\frac{1}{2}A)^2$, which is a scaled version of a signal representative of the energy in the received signal.

A processor 62 is coupled to receive the output signal of summer 60. Processor 62 may be a microcomputer including software to enable comparison and recognition of preselected signal characteristics for enabling sweep frequency signal generator 40, or for providing output signals corresponding to the resonant frequency and the quality factor Q of a received signal. In the first instance, processor 62 may compare the received signal to a reference amplitude for enabling generator 40 when amplitude of the received signal at the reference frequency reaches the reference amplitude. In the second instance, processor 62' may operate on the signal $(\frac{1}{2}A)^2$ using well-known engineering relationships to derive therefrom the quality factor and to provide an indication of the resonant frequency by correlating the time of receipt of the signal with the known sweep frequency rate and sweep start time. Such information can be provided to processor 62' by processor 62, as indicated by the dashed interconnection or, more practically, by implementation of processors 62, 62' in a single microcomputer.

The present invention utilizes a resonant structure formed of a thin film resonator preferably embedded in a polyurethane coating over the surface of a propeller blade. The polyurethane coating along with the dielectric at the surface, e.g., air, water or ice, form the dielectric of the distributed capacitance of the tuned resonant circuit such as circuit 20 in FIG. 2 or circuit 70 in FIG. 7. The presence of water, and to a lesser extent ice, at the resonant structure surface increases the capacitance and alters the quality factor. Each of the tuned resonant circuits 20 or 70 is proportioned so that the range of resonant frequency resulting from expected ice and water layers will not overlap the ranges of any other of the tuned resonant circuits 20 or 70. This design avoids ambiguity in locating a specific region of icing.

Since the dielectric properties of ice and water differ widely, e.g., ice has a dielectric constant of 3.2 and loss factor of 0.003 while water has a dielectric constant of 81 with a loss factor of 25.0, it is possible to distinguish between ice and water at a given location by the shift of resonance coupled with a Q value as measured by signal reflection. Thus, even if a thin layer of liquid water were to produce the same shift in resonance as a thicker layer of ice, the very much lower Q or quality factor due to the higher loss of liquid water would enable one to distinguish which state exists.

While the invention has been described in what is considered to be a preferred embodiment, other modifications, variations and changes will become apparent from the above description. Accordingly, it is intended that the invention not be limited to the specific described embodiment but be interpreted within the spirit and scope of the appended claims.

What is claimed is:

1. An ice detection system for detecting the state and thickness of water overlying a surface, comprising:
   a plurality of resonant circuits spaced at predetermined locations about an electrically conductive surface, each of said circuits consisting entirely of a respective cutout in said surface and having a preselected resonant frequency which varies in response to thickness of overlying ice and liquid water;
   variable frequency generating means for generating a transmission signal which can be varied about the resonant frequency of each of said circuits to cause each of said circuits to generate a resonant frequency signal in response to said transmission signal;
   receiver means tunable to the resonant frequency of each of said circuits, said receiver means including means for identifying the resonant frequency of each of said circuits and for determining the quality factor of each of said circuits from the resonant frequency signals produced by the respective circuits; and
   processing means responsive to the identified resonant frequency and determined quality factor for each of said circuits, for determining the state and thickness of water overlying each of said circuits.

2. The system of claim 1 wherein each respective one of said resonant circuits is tuned to a different preselected resonant frequency respectively, each resonant frequency being selected to permit remote identification of the location of each respective resonant circuit from the resonant frequency produced thereby.

3. The system of claim 1 wherein each of said resonant circuits is inductively coupled to said variable frequency generating means.

4. The system of claim 1 wherein said surface comprises an electrically conductive material and each respective one of said resonant circuits comprises a respective cutout in said electrically conductive material.

5. The system of claim 4 wherein each respective one of said resonant circuits comprises a dumbbell-shaped configuration having a pair of spaced circular ends interconnected by a region having generally parallel boundaries.

6. The system of claim 5 wherein each respective one of said resonant circuits includes an extension extending perpendicular to said region having generally parallel boundaries, and further including a semiconductor diode connected across said extension.

7. A method of detecting ice accretion on a surface of electrically conductive material having resonant circuits implanted thereon entirely by removal of portions of said material, each of said portions being of a predetermined pattern, each respective circuit being tuned to a separate preselected resonant frequency, respectively, said method comprising the steps of:
   transmitting an RF signal which varies over a predetermined range including the resonant frequency of each of the resonant circuits so as to excite each of the circuits at its own respective resonant frequency;
   detecting signals generated by at least some of the resonant circuits excited by the transmitted RF signal;
   determining any deviation in the frequency of each detected signal from the preselected resonant frequency for the circuit generating said each detected signal;
   computing the quality factor of each of said at least some resonant circuits from the detected signals generated thereby; and
   determining the state and thickness of a layer of water overlying any of said at least some resonant circuits from the frequency of the detected signals and the respective quality factors thereof.

8. The method of claim 7 including the step of creating a table of values of frequency and quality factor for liquid and solid states of water as a function of thickness of said layer of water, and wherein the step of determining the state and thickness of said layer of water includes the step of comparing the frequency of the detected signals and the computed quality factor to the table of values.

9. An ice detection system for an aircraft propeller blade comprising:
   a plurality of thin film resonant circuits bonded to an intermediate subsurface layer of a propeller blade and overlayed by a nonconductive surface protective coating, each of said resonant circuits being tuned to a preselected frequency;
   RF generating means for generating a fixed frequency pilot signal and a swept frequency signal, said swept frequency signal ranging through said preselected frequency;
   receiver means for detecting RF signals over a range including said preselected frequency, said receiver means being responsive to receipt of said pilot signal reflected from said propeller blade for signaling said RF generating means to initiate said swept frequency signal, said receiver means being further responsive to receipt of resonant frequency signals generated by said resonant circuits in response to said swept frequency signal for determining the resonant frequency and quality factor of the resonant circuits; and processing means for determining thickness of ice on said propeller blade from the determined resonant frequency and quality factor.

10. The system of claim 9 wherein each of said resonant circuits is tuned to a preselected frequency that is different from the preselected frequency to which each of the other resonant circuits is tuned, the processing means including means for correlating each respective resonant frequency signal received from said resonant circuits with a predetermined respective one of said resonant circuits for correlating ice thickness on said propeller blade with location of each respective one of said resonant circuits.

11. The system of claim 9 wherein each of said resonant circuits, respectively, includes a nonlinear element electrically connected thereto, respectively, for causing said circuits to emit energy at a harmonic of the fundamental resonant frequencies.

12. The system of claim 9 wherein each respective one of said resonant circuits comprises a dumbbell-shaped conductive path formed from an electrically conductive foil material so as to have a pair of spaced circular ends interconnected by a conductor having a first pair of generally parallel edges.

13. The system of claim 12 wherein said conductor in said each respective one of said resonant circuits includes a conductive extension with a second pair of generally parallel edges generally perpendicular to said first pair of generally parallel edges and a semiconductor diode connected across said second pair of generally parallel edges.

* * * * *

UNITED STATES PATENT AND TRADEMARK OFFICE
CERTIFICATE OF CORRECTION

PATENT NO. : 5,005,015

DATED : April 2, 1991

INVENTOR(S) : Dehn, et al

It is certified that error appears in the above-identified patent and that said Letters Patent is hereby corrected as shown below:

The title page should be deleted to appear as per attached title page.

Sheets 1 of 4 through 4 of 4 consisting of figures 1-7 should be added as shown on the attached sheets.

Columns 1-10 should be added as per attached.

Signed and Sealed this

Thirteenth Day of October, 1992

*Attest:*

DOUGLAS B. COMER

*Attesting Officer*     *Acting Commissioner of Patents and Trademarks*

United States Patent [19]

Dehn et al.

[11] Patent Number: 5,005,015

[45] Date of Patent: Apr. 2, 1991

[54] ICE DETECTION SYSTEM

[75] Inventors: Rudolph A. Dehn, Schenectady; Andrew J. Macdonald, Ballston Spa, both of N.Y.

[73] Assignee: General Electric Company, Schenectady, N.Y.

[21] Appl. No.: 390,125

[22] Filed: Aug. 7, 1989

[51] Int. Cl.$^5$ .................. G08B 21/00; B64D 15/00
[52] U.S. Cl. .................. 340/962; 244/134 F; 340/580
[58] Field of Search .......... 340/962, 905, 580, 581, 340/582, 583; 73/170 R, 590, 583; 244/134 R, 134 D, 134 F

[56] References Cited

U.S. PATENT DOCUMENTS

| | | | |
|---|---|---|---|
| 3,123,327 | 3/1964 | Padgett, Jr. | 340/580 |
| 3,540,025 | 11/1970 | Levin et al. | 340/962 |
| 4,461,178 | 7/1984 | Chamuel | 340/582 |
| 4,570,881 | 2/1986 | Lustenberger | 244/134 F |
| 4,688,185 | 8/1987 | Magenheim et al. | 340/580 |
| 4,766,369 | 8/1988 | Weinstein | 340/580 |

OTHER PUBLICATIONS

T. R. Ringer Head & J. R. Stallabrass, "The Dynamic Ice Detector For Helicopters", Agard Conference Proceedings, No. 236, Apr., 1978.
J. A. Gagliano et al., "Ice/Frost Detection System Using Millimeter Wave Radiometry", Final Report-NASA Contract NAS8-33800, Aug. 1981.
B. Magenheim et al., "Development and Test of a Microwave Ice Accretion Measurement Instrument (Miami)", NASA Contract Report 3598, Nov. 1982.
L. M. Weinstein, "Ice Detector" (Capacitive), Govt. Owned Patent #6,846,429, 1986 (NASA publication 86346479).

Primary Examiner—Herbert Goldstein
Assistant Examiner—Brent A. Swarthout
Attorney, Agent, or Firm—Marvin Snyder; James C. Davis, Jr.

[57] ABSTRACT

A system and method for detecting the state and thickness of water accumulation on a surface incorporates a plurality of spaced, thin, electrically resonant circuits bonded to the surface and a radio frequency transmitter for exciting the circuits to resonance. A receiver detects the resonant signal from each circuit, determines the resonant frequency and quality factor of the circuit and correlates that information with predetermined data representing changes in resonant frequency and quality factor as a function of liquid water and ice accretion to thereby establish the state and thickness of water overlaying the circuits.

13 Claims, 4 Drawing Sheets

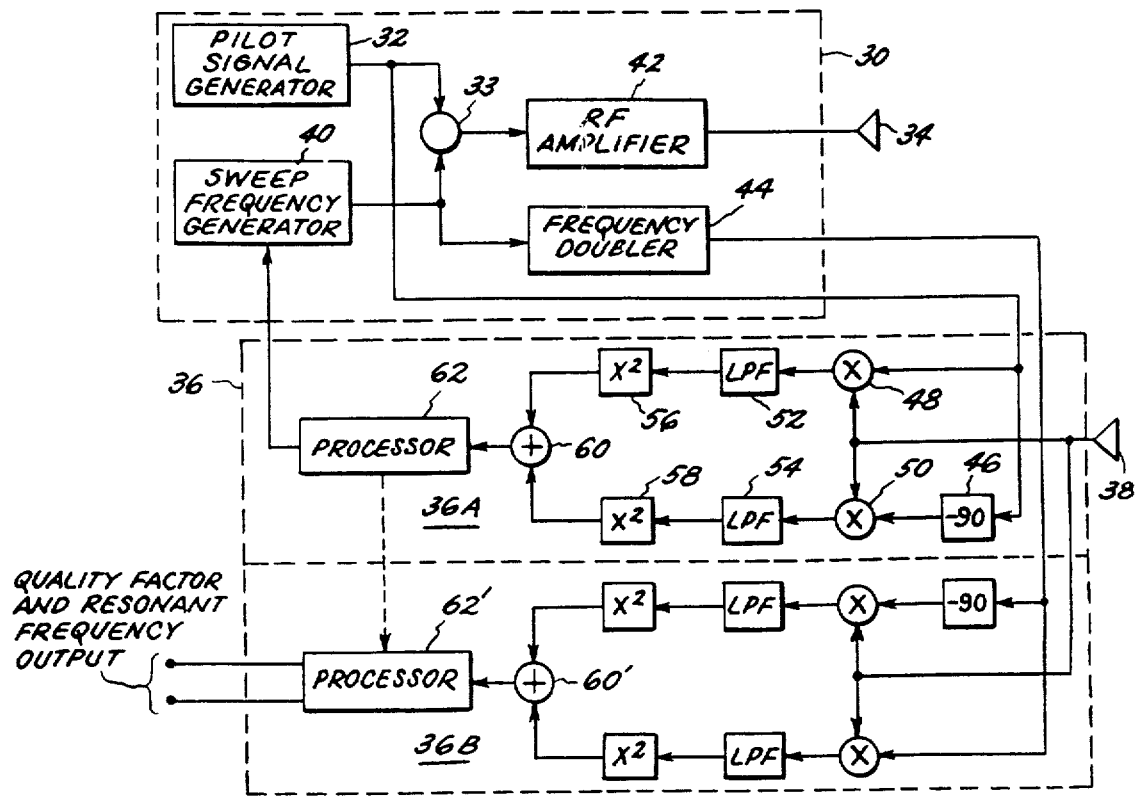

ICE DETECTION SYSTEM

BACKGROUND OF THE INVENTION

This invention relates to ice detectors and, more particularly, to an ice detector for determining location and thickness of ice build-up on an aircraft propeller.

Various forms of ice detectors for use with aircraft have been developed. Such detectors include radiometric devices broadcasting in the 35-95 GHz frequency band and relying on frequency shifts in reflected waves such as is disclosed in NASA Contract NAS8-33800 on "Ice/Frost Detection System Using Millimeter Wave Radiometry". Another form of millimeter wave detection is described in NASA Contract Report 3598 entitled "Development and Test of a Microwave Ice Accretion Measurement Instrument (MIAMI)". This latter device uses a resonant surface-mounted transducer whose resonant frequency varies in proportion to thickness of an overlying ice layer. A microcomputer monitors the resonant frequency of the transducer to provide a continuous indication of ice thickness. The transducer is described as a resonant wave guide. Still another ice detector, described in NASA publication 86346479, also identified as NASA-CASE-LAR-13403-1, "Ice Detector", uses a pair of capacitance gauges in combination with a temperature gauge mounted in a cavity on an aircraft structure. The temperature gauge provides an indication of the state of any overlying water, i.e., solid or liquid, while the capacitance gauges provide an indication of thickness.

The above-identified ice detectors have not been fully satisfactory, as is evident by the extent of ongoing research into alternative devices. For example, radiometry requires an essentially stationary surface, and a large power source and antenna for illuminating the surface to be viewed. The resonant wave guide is an intrusive device and requires a directly coupled power source which may be acceptable in surfaces that are not essential to structural integrity but could detrimentally affect structural integrity in applications where such surfaces are essential to structural integrity. Similarly, use of capacitance and temperature gauges requires intrusion into a surface and some form of direct connection for readout The application of any of these systems to high-speed rotating aircraft propellers could therefore present unsolvable problems.

SUMMARY OF THE INVENTION

One object of the present invention is to provide an ice detection system which overcomes the above and other disadvantages of the prior art.

Another object is to provide a nonintrusive system for determining thickness of water, in a liquid or solid state, at predetermined locations atop a surface.

Another object is to provide an ice detection system having a nonintrusive transducer which can be remotely interrogated to determine ice conditions.

Another object is to provide an ice detection system that can be employed on a high speed rotating aircraft propeller.

Briefly, in accordance with a preferred embodiment of the invention, an ice detection system for detecting the state (i.e., solid or liquid) and thickness of water overlying a surface comprises a plurality of surface-mounted resonant circuits spaced at predetermined locations about the surface, each circuit having a respective preselected resonant frequency which varies in response to thickness of overlying water, whether in its solid state (i.e., ice), or in its liquid state. A variable frequency generating means generates a signal which can be varied about the resonant frequency of each of the circuits. A receiver means is tunable to the resonant frequency of each of the circuits and includes means for identifying the resonant frequency of each of the circuits and for determining the quality factor (Q) of each circuit. Processing means responsive to the identified resonant frequency and determined quality factor establish the state of thickness of water overlying each of the resonant circuits.

Each of the resonant circuits, respectively, is preferably tuned to a different preselected resonant frequency, respectively, to permit remote identification of the location of the resonant circuit from the resonant frequency. The resonant circuits preferably comprise thin foil members, each member having its own unique resonant aperture formed therein which can be excited by received radio frequency (RF) signals. The thin film resonant circuits may be bonded to an intermediate subsurface layer of a propeller blade and overlaid with a nonconductive surface protective coating such as a polyurethane coating.

The variable frequency generating means may comprise a high frequency radio transmitter which can be variably swept through a predetermined frequency range encompassing the resonant frequencies of all of the tuned circuits. The receiver means may be keyed by the transmitter for correlating the received signals with the transmitted signals in order to ascertain the location of each of the resonant circuits. The processing means determines the thickness of ice or liquid overlying each of the resonant circuits from the resonant frequency of the respective circuit and that circuit's corresponding quality factor. The processing means preferably includes a microcomputer having a memory in which is stored a table of predetermined resonant frequencies and quality factors corresponding to different thicknesses of ice and liquid overlying each of the resonant circuits. By correlating the detected resonant frequency of each of the respective circuits and computed quality factor of those circuits, the processing means can determine from the look-up table the thickness and state of water overlying each of the resonant circuits.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic representation of a gas turbine unducted fan engine showing a pair of propellers illustrating one use of the present invention;

FIG. 2 a planar illustration of one form of thin film resonant for use with the present invention;

FIG. 3 illustrates a propeller blade having a plurality of spaced resonant circuits of different resonant frequencies, respectively, for detecting ice conditions at various locations of the blade;

FIG. 4 is a graph of frequency and amplitude of an excitation signal for exciting the resonant circuits of FIG. 3, compared with signals produced by the resonant circuits;

FIG. 5 illustrates an alternative method of exciting the resonant circuits of FIG. 3 through use of inductive coupling;

FIG. 6 is a simplified block diagram of one form of radio frequency generator and receiver for practicing the present invention; and FIG. 7 is an alternative form of resonant circuit for generating a resonant signal at twice the frequency of the excitation signal.

DETAILED DESCRIPTION OF THE INVENTION

FIG. 1 is a schematic representation of a gas turbine unducted fan engine 10 showing a pair of counterrotating propellers 12 and 14 which are driven by the engine. Each of propellers 12 and 14 includes a plurality of propeller blades 16 and 18, respectively. Mounted on each of the propeller blades is a plurality of thin film resonant circuits 20. The circuits, which for simplicity of illustration are shown schematically on only one of blades 16, may be excited by RF energy transmitted from a transmission source 22 or, in an alternative embodiment, may be energized by an RF source 24 inductively coupled thereto.

A detailed view of one of the blade-mounted resonant circuits 20 is shown in FIG. 2. Each resonant circuit is preferably a dog bone or dumbbell-shaped thin foil or film of electrically conductive material. The center portion 26 of the resonant circuit comprises a pair of parallel conductive foil elements which exhibit a capacitance C, while each of the circular ends 28 of the resonant structure exhibits an inductance L. The interconnected ends 28 and the interconnecting center portion 26 thus form an LC circuit having a characteristic resonant frequency. The physical dimensions of the circuit can be varied in order to tune the circuit so as to change its resonant frequency. In a preferred embodiment, resonant circuits 20, spaced apart from each other at different predetermined locations on each of propeller blades 16 and 18 shown in FIG. 1, are sized so that each respective one of the circuits has a respective resonant frequency unique to that circuit. This allows the resonant circuits to be bonded, or otherwise adhered, to the blades at preselected positions thereon, so that signals from any particular one of the resonant circuits can be associated with the preselected location by identifying the received resonant frequency.

TABLE I

| RESONANT FREQUENCY | Q | CONDITION |
|---|---|---|
| 75 MHz | 324 | no ice or water |
| 73.9 MHz | 282 | ~.032" water liquid |
| 74.9 MHz | 340 | ~.032" ice solid |
| 73.3 MHz | 255 | ~.25" water liquid |
| 74.8 MHz | 340 | ~.25" ice solid |

Table 1 illustrates the variation in resonant frequency and quality factor (Q) for one type of tuned resonant circuit in response to different thicknesses (or depths) of overlying ice or water. The circuit was initially tuned to a resonant frequency of 75 MHz with a quality factor of 324. When the circuit was covered with a ⅛ inch layer of liquid water, the resonant frequency changed to 73.9 MHz and the quality factor, or Q, of the circuit dropped to 282. When the water thickness was raised to ¼ inch, the resonant frequency dropped further to 73.3 MHz and the quality factor dropped even further to 255. When the circuit was covered with a ⅛ inch layer of ice (rather than liquid water), the resonant frequency dropped to 74.9 MHz and the quality factor increased to 340. For a ¼ inch layer of ice, the resonant frequency dropped to 74.8 MHz while the quality factor stayed constant at 340. Thus the resonant frequency in combination with the Q for the resonant circuit at that frequency provides an indication of the state of the water overlying the tuned circuit, i.e., whether the water is ice or liquid, and further provides an indication of the thickness of the layer. Even at ⅛ inch difference in thickness provides a frequency change which can be detected.

FIG. 3 shows a single propeller blade 16 with a plurality of thin film resonant circuits 20 dispersed at positions A-F along the surface of the blade. Each of circuits 20 is differently sized so as to have a unique resonant frequency, i.e., a resonant frequency that is different from that of the others of circuits 20. Transmitter 22, shown in FIG. 1, generates a fixed amplitude variable frequency signal which interrogates or excites each of the tuned resonant circuits 20 on blade 16.

FIG. 4 is a graph indicating the constant amplitude and linearly-increasing frequency of the RF signal from transmitter 22, shown in FIG. 1, while line 27 is a graph of a correlated resonant signal produced by each of tuned circuits 20 in response to the excitation frequency of the RF signal transmitted by transmitter 22 (shown in FIG. 1). The resonant signals produced by each of resonant circuits 20 at positions A-F of FIG. 3 can be distinguished by their time of occurrence with respect to initiation of an RF pulse from transmitter 22. Since the transmitter frequency increases substantially linearly from its initiation until termination, the resonant frequencies are time-distributed, as shown in FIG. 4. Time, and therefore frequency, correlation of the transmitted signal with signals returned from the resonant circuits allows the resonant frequency of each of resonant circuits 20 to be readily determined. Each of the correlated received signals can also be analyzed in a well-known manner to provide a measurement of the Q or quality factor of each one of resonant circuits 20. As illustrated by Table 1, the quality factor provides an accurate indication of the state and depth of any water overlying each one of resonant circuits 20.

In an alternative embodiment of the present invention, as illustrated in FIG. 5, an RF excitation source 50 is inductively coupled through inductive coupling devices, shown as the windings of a transformer 51, directly to each of tuned circuits 20. While this arrangement eliminates the need for transmission of a radiated RF signal, it requires coupling of a rotating source of excitation to the rotating portion of the nacelle of engine 10 (shown in FIG. 1) adjacent the propeller blades. This, in turn, requires coupling of RF power to the rotating blade. The RF power source can be located conveniently within the nacelle and include a suitable transmission line to conduct power to an inductive coupling device (e.g., a transformer primary winding) adjacent the hub of the rotating blade. A corresponding coupling device (e.g., a transformer secondary winding) mounted at the blade hub can receive the inductively coupled power for distribution along an appropriate conductive path 52 directly to the various resonant circuits 20 on the blade. In either the radiated transmission or the inductively coupled method, the operation of resonant circuits 20 is substantially the same as described with reference to FIG. 3.

FIG. 6 shows a combined RF generator and receiver of a type which may be used with the present invention. The RF generator, or transmitter, provides excitation to the resonant circuits on each of the propeller blades. Transmitter 30 includes a pilot signal generator 32 which generates a fixed frequency pilot signal. This signal is utilized to detect the presence of a propeller blade in a position such that the resonant circuits affixed thereto can be excited by RF energy transmitted from an antenna 34. Alternatively, the antenna can be replaced by a transformer as shown in FIG. 5. The receiver 36 includes a receive antenna 38 for receiving either reflected energy from the propeller blades or return energy generated by the resonant circuits on the blades. As in the case of the transmitted signal, the received signal may also be coupled inductively. When receiver 36 detects a reflected signal corresponding to the frequency of the pilot signal, the receiver provides a trigger signal to a variable or sweep frequency signal generator 40 in transmitter 30. Sweep frequency generator 40 then produces a swept frequency signal which is summed with the pilot signal in a summer 33. The output signal from summer 33 is amplified by an RF amplifier 42 and transmitted from antenna 34. The swept frequency signal from signal generator 40 is also supplied through a frequency doubler 44 to receiver 36.

A desirable feature of the ice detection system is that it is possible to distinguish between signals reflected from a propeller blade and signals generated by the various resonant circuits. One method of accomplishing this feature is to construct the resonant circuits so that they resonate at some multiple of the excitation frequency from sweep frequency generator 40. A multiple of two can be achieved by modifying the resonant circuits to the form shown in FIG. 7. The basic requirement is that a voltage at the fundamental frequency be impressed on a nonlinear circuit element such as a semiconductor diode. The resulting current then applied to each resonant circuit is in the form of a highly distorted sinusoid which may be resolved into a series of currents at harmonics of the fundamental frequency. If the circuit arrangement is such as to provide significant impedance to a selected harmonic of current, a voltage at that harmonic is produced with sufficient amplitude to allow extraction of energy at that harmonic by radiation or transmission line coupling. A circuit 70 for producing the aforesaid harmonic voltage, as shown in FIG. 7, is preferably of the dumbbell or dog bone shaped resonant circuit 20 depicted in FIG. 2. Circuit 70 is preferably fabricated as a cutout in a conducting metallic sheet, e.g., etched in the foil of a circuit board or impressed into the metallic surface of a propeller blade. An extended slot 72 is impressed or etched such that the combined cutout is resonant at both the fundamental and second harmonic of the driving signal applied to the circuit. Such dual mode resonators are well known in the art. In order to generate the second harmonic energy, a semiconductor diode 74, preferably in the form of a beam-leaded chip, is connected across slot 22 at a location to effect optimal energy conversion.

Thus, the implementation of the second harmonic detection system contemplates an array of dual resonant circuits dispersed over the surface of the blade with a distribution of resonant frequencies to identify spatial locations of ice formation and with added discrimination against unwanted reflections of the fundamental frequency signals.

In the illustrative embodiment of FIG. 6, transmitter 30 transmits RF energy to resonant circuits such as shown in FIG. 7 on the propeller blades while at the same time providing a signal at twice the sweep frequency from frequency doubler 44 to receiver 36. The transmitted signal is the sum of the pilot signal from signal generator 32 and the sweep frequency signal from signal generator 40. The pilot signal is supplied to receiver 36 to enable detection of the signal reflected from the propeller blades as they become aligned with the transmitter antenna 34. The frequency-doubled sweep frequency signal is supplied to receiver 36 to enable detection of the doubled-frequency signals generated by the resonant circuits on the propeller blades.

While various types of receivers may be employed to detect and identify signals of known frequency (within a predetermined range) and unknown phase, FIG. 6 illustrates one form of such a receiver. Both the pilot signal portion 36A of receiver 36, and the sweep frequency portion 36B thereof, are substantially identical. For purposes of discussion, it can be assumed that the basic reference signal supplied to each resonant circuit is defined by the expression $\cos(\omega_c t)$, where $\omega_c$ represents the signal frequency and $t$ represents time. The received signal (reflected from a blade or generated by a resonant circuit) can be defined by the expression $A\cos(\omega_c t + \theta)$, where $\theta$ is an unknown phase shift. A further reference signal $\sin(\omega_c t)$ is produced by phase shifting the basic reference signal by $-90°$ in a phase shifter 46.

The received signal $A\cos(\omega_c t + \theta)$ is multiplied by $\cos(\omega_c t)$ in a multiplier 48 and by $\sin(\omega_c t)$ in a multiplier 50 to produce respective signals with frequency sum and frequency difference components. Each of the resultant signals is then coupled to corresponding low pass filters 52, 54 which serve to strip the frequency sum components leaving only $\frac{1}{2}(A\cos\theta)$ and $\frac{1}{2}(A\sin\theta)$. Each of these signals is then squared in respective multipliers 56, 58 to generate the signals $(\frac{1}{2}A)^2\cos^2\theta$ and $(\frac{1}{2}A)^2\sin^2\theta$. Addition of these latter signals in a summer 60 produces the signal $(\frac{1}{2}A)^2$, which is a scaled version of a signal representative of the energy in the received signal.

A processor 62 is coupled to receive the output signal of summer 60. Processor 62 may be a microcomputer including software to enable comparison and recognition of preselected signal characteristics for enabling sweep frequency signal generator 40, or for providing output signals corresponding to the resonant frequency and the quality factor Q of a received signal. In the first instance, processor 62 may compare the received signal to a reference amplitude for enabling generator 40 when amplitude of the received signal at the reference frequency reaches the reference amplitude. In the second instance, processor 62' may operate on the signal $(\frac{1}{2}A)^2$ using well-known engineering relationships to derive therefrom the quality factor and to provide an indication of the resonant frequency by correlating the time of receipt of the signal with the known sweep frequency rate and sweep start time. Such information can be provided to processor 62' by processor 62, as indicated by the dashed interconnection or, more practically, by implementation of processors 62, 62' in a single microcomputer.

The present invention utilizes a resonant structure formed of a thin film resonator preferably embedded in a polyurethane coating over the surface of a propeller blade. The polyurethane coating along with the dielectric at the surface, e.g., air, water or ice, form the dielectric of the distributed capacitance of the tuned resonant circuit such as circuit 20 in FIG. 2 or circuit 70 in FIG. 7. The presence of water, and to a lesser extent ice, at the resonant structure surface increases the capacitance and alters the quality factor. Each of the tuned resonant circuits 20 or 70 is proportioned so that the range of resonant frequency resulting from expected ice and water layers will not overlap the ranges of any other of the tuned resonant circuits 20 or 70. This design avoids ambiguity in locating a specific region of icing.

Since the dielectric properties of ice and water differ widely, e.g., ice has a dielectric constant of 3.2 and loss factor of 0.003 while water has a dielectric constant of 81 with a loss factor of 25.0, it is possible to distinguish between ice and water at a given location by the shift of resonance coupled with a Q value as measured by signal reflection. Thus, even if a thin layer of liquid water were to produce the same shift in resonance as a thicker layer of ice, the very much lower Q or quality factor due to the higher loss of liquid water would enable one to distinguish which state exists.

While the invention has been described in what is considered to be a preferred embodiment, other modifications, variations and changes will become apparent from the above description. Accordingly, it is intended that the invention not be limited to the specific described embodiment but be interpreted within the spirit and scope of the appended claims.

What is claimed is:

1. An ice detection system for detecting the state and thickness of water overlying a surface, comprising:
    a plurality of resonant circuits spaced at predetermined locations about an electrically conductive surface, each of said circuits consisting entirely of a respective cutout in said surface and having a preselected resonant frequency which varies in response to thickness of overlying ice and liquid water;
    variable frequency generating means for generating a transmission signal which can be varied about the resonant frequency of each of said circuits to cause each of said circuits to generate a resonant frequency signal in response to said transmission signal;
    receiver means tunable to the resonant frequency of each of said circuits, said receiver means including means for identifying the resonant frequency of each of said circuits and for determining the quality factor of each of said circuits from the resonant frequency signals produced by the respective circuits; and
    processing means responsive to the identified resonant frequency and determined quality factor for each of said circuits, for determining the state and thickness of water overlying each of said circuits.

2. The system of claim 1 wherein each respective one of said resonant circuits is tuned to a different preselected resonant frequency respectively, each resonant frequency being selected to permit remote identification of the location of each respective resonant circuit from the resonant frequency produced thereby.

3. The system of claim 1 wherein each of said resonant circuits is inductively coupled to said variable frequency generating means.

4. The system of claim 1 wherein said surface comprises an electrically conductive material and each respective one of said resonant circuits comprises a respective cutout in said electrically conductive material.

5. The system of claim 4 wherein each respective one of said resonant circuits comprises a dumbbell-shaped configuration having a pair of spaced circular ends interconnected by a region having generally parallel boundaries.

6. The system of claim 5 wherein each respective one of said resonant circuits includes an extension extending perpendicular to said region having generally parallel boundaries, and further including a semiconductor diode connected across said extension.

7. A method of detecting ice accretion on a surface of electrically conductive material having resonant circuits implanted thereon entirely by removal of portions of said material, each of said portions being of a predetermined pattern, each respective circuit being tuned to a separate preselected resonant frequency, respectively, said method comprising the steps of:
    transmitting an RF signal which varies over a predetermined range including the resonant frequency of each of the resonant circuits so as to excite each of the circuits at its own respective resonant frequency;
    detecting signals generated by at least some of the resonant circuits excited by the transmitted RF signal;
    determining any deviation in the frequency of each detected signal from the preselected resonant frequency for the circuit generating said each detected signal;
    computing the quality factor of each of said at least some resonant circuits from the detected signals generated thereby; and
    determining the state and thickness of a layer of water overlying any of said at least some resonant circuits from the frequency of the detected signals and the respective quality factors thereof.

8. The method of claim 7 including the step of creating a table of values of frequency and quality factor for liquid and solid states of water as a function of thickness of said layer of water, and wherein the step of determining the state and thickness of said layer of water includes the step of comparing the frequency of the detected signals and the computed quality factor to the table of values.

9. An ice detection system for an aircraft propeller blade comprising:
    a plurality of thin film resonant circuits bonded to an intermediate subsurface layer of a propeller blade and overlayed by a nonconductive surface protective coating, each of said resonant circuits being tuned to a preselected frequency;
    RF generating means for generating a fixed frequency pilot signal and a swept frequency signal, said swept frequency signal ranging through said preselected frequency;
    receiver means for detecting RF signals over a range including said preselected frequency, said receiver means being responsive to receipt of said pilot signal reflected from said propeller blade for signaling said RF generating means to initiate said swept frequency signal, said receiver means being further responsive to receipt of resonant frequency signals generated by said resonant circuits in response to said swept frequency signal for determining the resonant frequency and quality factor of the resonant circuits; and processing means for determining thickness of ice on said propeller blade from the determined resonant frequency and quality factor.

10. The system of claim 9 wherein each of said resonant circuits is tuned to a preselected frequency that is different from the preselected frequency to which each of the other resonant circuits is tuned, the processing means including means for correlating each respective resonant frequency signal received from said resonant circuits with a predetermined respective one of said resonant circuits for correlating ice thickness on said propeller blade with location of each respective one of said resonant circuits.

11. The system of claim 9 wherein each of said resonant circuits, respectively, includes a nonlinear element electrically connected thereto, respectively, for causing said circuits to emit energy at a harmonic of the fundamental resonant frequencies.

12. The system of claim 9 wherein each respective one of said resonant circuits comprises a dumbbell-shaped conductive path formed from an electrically conductive foil material so as to have a pair of spaced circular ends interconnected by a conductor having a first pair of generally parallel edges.

13. The system of claim 12 wherein said conductor in said each respective one of said resonant circuits includes a conductive extension with a second pair of generally parallel edges generally perpendicular to said first pair of generally parallel edges and a semiconductor diode connected across said second pair of generally parallel edges.

* * * * *